United States Patent [19]
Anson

[11] Patent Number: 6,164,189
[45] Date of Patent: Dec. 26, 2000

[54] HEATED WATER DISPENSING SYSTEM

[75] Inventor: James H. Anson, Auburn, Ill.

[73] Assignee: Bunn-O-Matic Corporation, Springfield, Ill.

[21] Appl. No.: 09/415,925

[22] Filed: Oct. 12, 1999

[51] Int. Cl.$^7$ .................. A47J 31/56; F24H 1/20
[52] U.S. Cl. .................. 99/281; 99/282; 392/449; 222/55; 222/77; 222/146.5
[58] Field of Search .................. 99/281, 282, 283, 99/280; 222/54, 55, 77, 146.5; 392/449, 457, 402

[56] References Cited

U.S. PATENT DOCUMENTS

| | | | |
|---|---|---|---|
| 3,100,434 | 8/1963 | Bunn | 99/282 |
| 3,371,593 | 3/1968 | Price | 99/283 |
| 4,480,173 | 10/1984 | Butterfield | 99/281 X |
| 4,917,005 | 4/1990 | Knepler | 99/280 |
| 4,978,833 | 12/1990 | Knepler | 392/449 |
| 5,111,969 | 5/1992 | Knepler | 222/54 |
| 5,285,717 | 2/1994 | Knepler | 99/282 |
| 5,346,098 | 9/1994 | King et al. | 222/146.5 |
| 5,386,944 | 2/1995 | Knepler et al. | 247/6 |
| 5,584,229 | 12/1996 | Anson | 99/280 |
| 5,623,574 | 4/1997 | Knepler | 392/457 |
| 5,738,247 | 4/1998 | Kuan | 222/77 |
| 5,858,437 | 1/1999 | Anson | 426/437 |

Primary Examiner—Reginald L. Alexander
Attorney, Agent, or Firm—Trexler, Bushnell, Giangiorgi & Blackstone, Ltd.

[57] ABSTRACT

A heated water dispensing apparatus has been described. The heated water dispensing apparatus includes a reservoir for retaining a quantity of water, a selector for selecting a temperature of water and a volume of water to be dispensed, and a controllable dispense valve for automatically dispensing water from the reservoir. The heated water dispensing apparatus also includes a weighing assembly which generates a weight control signal relating to the volume of water dispensed through the dispense valve and at least one device outlet valve for providing heated water to a remote device. The heated water dispensing apparatus also includes a controller. The controller operates the dispense valve in accordance with the weight control signal so that a selected volume of water is automatically and accurately dispensed. The controller also operates the dispense valve to prevent dispensing of water through the dispense valve before water of a selected temperature has been produced. The controller operates the device outlet valve so that a predetermined quantity of water at a predetermined flowrate and a predetermined temperature is dispensed to a selected remote device.

21 Claims, 4 Drawing Sheets

HEATED WATER DISPENSING SYSTEM

BACKGROUND TO THE INVENTION

The present invention relates to a heated water dispensing apparatus and in particular to an improved heated water dispensing apparatus capable of automatically dispensing preselected volumes of water at preselected temperatures.

It is desirable in restaurants and other institutional cooking establishments to have a source of hot water for various cooking purposes. For example, hot water is necessary in the preparation of soups, pastas, gravies, pizza dough and other dishes. Additionally, a source of hot water is desirable in the preparation of hot chocolate, tea, coffee, and other hot or brewed beverages. Moreover, a source of hot water is desirable for various cleaning purposes.

To supply hot water for these and other purposes, hot water dispensers have come into increasing use. Typically, these units employ a hot water reservoir in which water is heated by an electric resistance heater element. The application of electric current to the heating element is typically controlled by various means responsive to a temperature sensing element in the reservoir. The units typically also employ temperature selection means in the form of a temperature control module. The temperature control module includes a potentiometer for setting the temperature of water to be dispensed. The temperature control module allows a user to set a dispensing temperature within a relatively narrow range of temperatures. If a dispensing temperature outside of that range is desired, a new temperature module must be provided having an operating range which includes the newly desired dispensing temperature.

Manually operated spigots or faucets are also usually provided for dispensing the water.

Conventional hot water dispensers suffer from a number of disadvantages. In particular, it is inconvenient and impractical to have to modify the dispenser whenever a water dispensing temperature outside the current operating range of the dispenser is needed. Unfortunately, in a restaurant or other cooking environment the need to modify the machine arises frequently because of the different water temperatures necessary to produce different types of food.

For example, 185° F. water is used to make soup whereas 200° F. is used to produce coffee. Another drawback is the inability of existing dispensers to produce water of a desired temperature quickly. The water supply for dispensers typically comprise unheated tap water; the heating up of relatively cool incoming tap water using an electric resistance element to the relatively high temperatures necessary for cooking can be a fairly slow process. Such delay can be particularly disadvantageous in a restaurant or other cooking environment in which efficient service is important to the viability of the restaurant. A further drawback is wastage of hot water, because of user-related error in dispensing; i.e., users of the machine often dispense too much water from the machine. Users can also dispense water of the incorrect temperature unwittingly, which degrades the quality of the food or beverage being prepared. Yet another disadvantage is that water of only a single temperature can be provided at any one time; this can be impractical in a restaurant environment where often several foods or beverages, each requiring a different water temperature, are being prepared simultaneously.

Another drawback of existing hot water dispensers is that it is necessary to deliver a quantity of water manually to the device requiring water. Such manual delivery is inefficient. Such manual delivery can also be inconvenient in the typically crowded kitchen environment in which food is prepared. There is also an increased likelihood that water will be spilled if an operator has to carry a quantity of water to its destination. Spilled water is, of course, undesirable since it is wasted.

SUMMARY AND OBJECTS OF THE INVENTION

Accordingly, it is a general object of the present invention to provide a heated water dispenser capable of automatically producing water of a wide range of temperatures.

It is an additional object of the present invention to provide a heated water dispenser capable of producing water of a selected temperature quickly and efficiently.

It is another object of the present invention to provide a heated water dispenser capable of automatically and accurately dispensing a preselected volume of water.

It is a further object of the present invention to provide a hot water dispenser capable of dispensing water at a plurality of temperatures simultaneously.

Yet another object of the present invention is to provide a heated water dispensing apparatus capable of automatically dispensing a predetermined quantity of water at a predetermined temperature to a remote device.

A further object of the present invention is to provide a heated water dispensing apparatus which permits dispensing therefrom only if predetermined operating conditions are met.

Other objects and advantages will become apparent from the ensuing description.

Accordingly, the present invention provides a heated water dispensing apparatus for dispensing water at a selected temperature comprising a reservoir for retaining a quantity of water and a controller. A heater is coupled to the reservoir and the controller for controllably heating the water retained in the reservoir. An inlet valve is coupled to the reservoir, the controller, and to at least one of a heated water source and an unheated water source for controlling the flow of water from a water source. A dispense valve is coupled to the controller and communicates with the reservoir for controllably dispensing water from the reservoir. A temperature sensor is coupled to the controller and the reservoir for sensing the temperature of water in the reservoir and generating a temperature control signal relating to the temperature sensed. A temperature selector is provided for selecting a temperature of water to be produced and generating a selection control signal corresponding to the selected temperature. The controller receives the temperature control signal and the selection control signal and controllably operates the heater and the inlet valve in accordance with the received signals to produce water of the selected temperature in the reservoir. The controller closes the dispense valve while water of the selected temperature is being produced to prevent dispensing of water from the reservoir before water of the selected temperature has been produced.

The present invention also provides a heated water dispensing apparatus comprising a reservoir for retaining a quantity of water, a controller, and a heater coupled to the reservoir and the controller for controllably heating the water retained in the reservoir. A dispensing valve is coupled to the controller and communicates with the reservoir for controllably dispensing water from the reservoir. A volume selector is provided for selecting a volume of water to be dispensed and for producing a volume control signal corresponding to the selected volume. The heated water dispensing apparatus also includes a weighing assembly for receiving a dispenser into which the selected volume of water is dispensed and for sensing the weight of water dispensed into the dispenser. The weighing assembly is adapted to generate a weight signal corresponding to the weight of water dispensed and transmit it to the controller. The controller receives the volume control signal and the weight signal and determines from the volume control signal the weight of water corresponding to the selected volume of water. The controller is adapted to compare the weight signal to the determined corresponding weight and to control the dispensing valve as a function of the comparison so that the dispensing valve is shut off when the weight control signal and the corresponding weight reach parity.

The present invention further provides a heated water dispensing apparatus for controllably dispensing heated water to at least one remote device which comprises a reservoir for retaining a quantity of water, a controller, and a heater coupled to the reservoir and the controller for heating the water retained in the reservoir. The heated water dispensing apparatus also includes an inlet valve coupled to the controller and communicating with the reservoir for controlling the flow of water from a water source. A temperature sensor is coupled to the reservoir and the controller for sensing the temperature of water in the reservoir and generating a temperature control signal corresponding to the temperature sensed. At least one device outlet valve is coupled to the controller and communicates with the reservoir. Each of the device outlet valves controllably dispenses water to one of the remote devices. A device selector is provided for selecting a remote device into which heated water is to be dispensed and for generating a device selector signal corresponding to the remote device selected. The controller receives the device selector signal and determines in response to the device selector signal the quantity, flow rate and temperature of water required to produce a predetermined substance in the selected remote device. The controller also receives the temperature control signal and controllably operates the heater and the inlet valve in accordance with the temperature control signal so that water of the required temperature is produced in the reservoir. The controller operates the device outlet valve corresponding to the selected remote device when the water in the reservoir reaches the required temperature so that the required quantity of water at the required flow rate is dispensed to the selected device.

BRIEF DESCRIPTION OF THE DRAWINGS

The present invention will now be described by way of example with reference to the accompanying drawings in which.

DETAILED DESCRIPTION OF A PREFERRED EMBODIMENT

Figure 1:
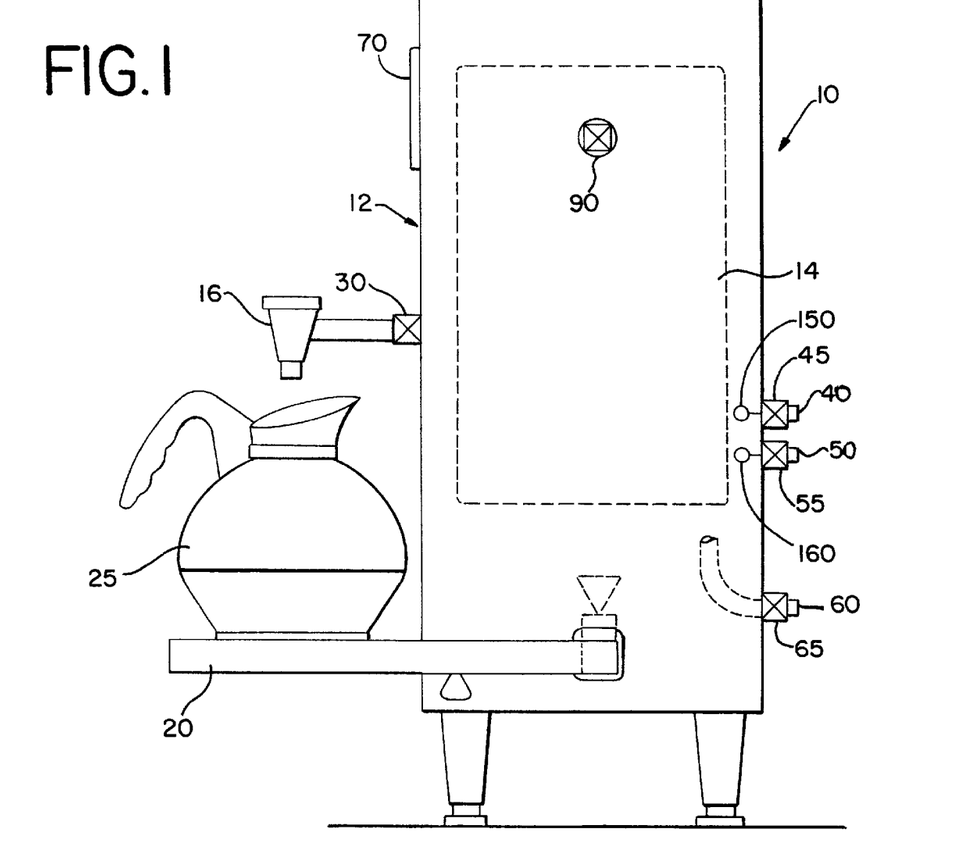
FIG. 1 is a diagrammatic side elevational view of a heated water dispenser according to the invention.
Figure 3:
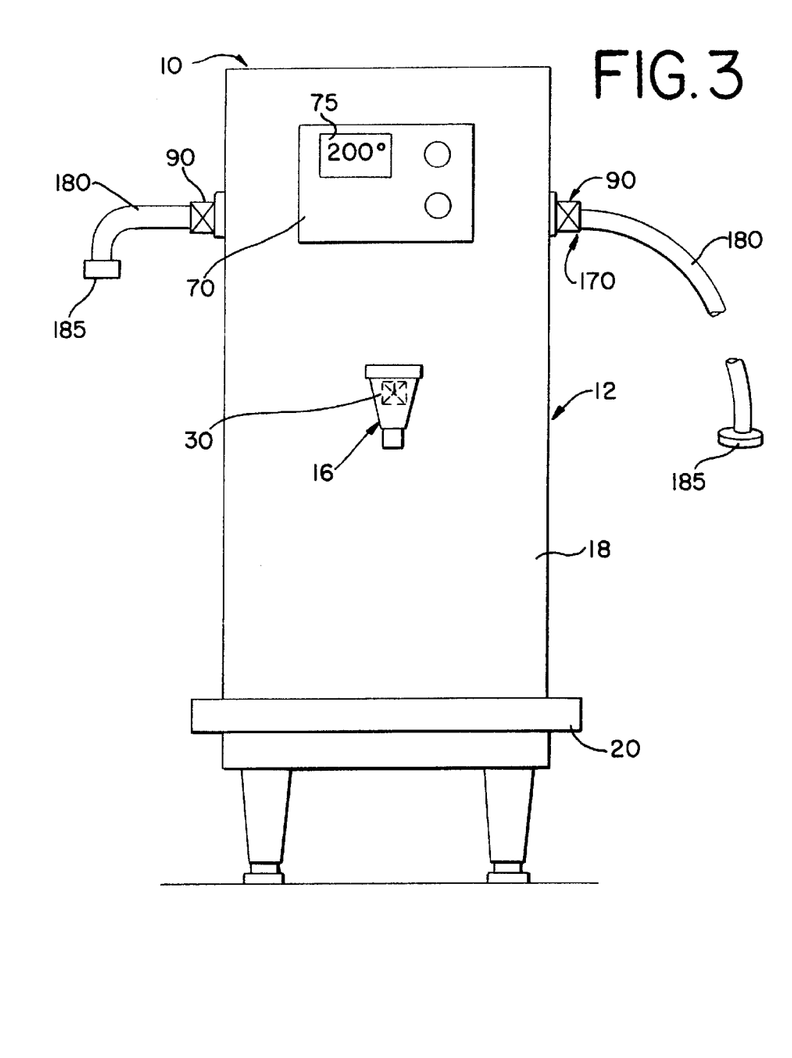
FIG. 3 is a diagrammatic, front elevational view of a heated water dispenser according to the invention.

Reference is now invited to FIGS. 1 and 3 which are, respectively diagrammatic side and front elevational views of a heated water dispensing apparatus 10 according to the invention. As illustrated, a heated water dispensing apparatus 10, according to the invention, includes a housing 12. The housing 12 retains, within its interior, a heated water reservoir 14 for holding a quantity of hot water. A faucet or spigot 16 is coupled to the reservoir 14 for dispensing water from the reservoir 14 into a receptacle or container 25. In the illustrated embodiment, the faucet or spigot 16 is provided on a front panel 18 of the housing 12. Conveniently, a container platform 20 is provided beneath the faucet or spigot 16 on which to rest a receptacle 25 during dispensing. A dispensing valve 30 is coupled to the faucet 16 and the reservoir 14 for controlling the flow of water from the reservoir 14 through the faucet 16.

The heated water dispensing apparatus 10 also includes a first water inlet 40, a second water inlet 50, and a water outlet or drain 60. The first and second water inlets 40, 50 provide the reservoir 14 with water from first and second water sources (not illustrated), respectively. The water outlet or drain 60 is provided for emptying the reservoir 14 of water. A first inlet valve 45 is coupled to the first water inlet 40 for controlling the flow of water to the reservoir 14 from the first water source. Similarly, a second inlet valve 55 is coupled to the second inlet 50 for controlling the flow of water from the second water source. A drain valve 65 is coupled to the reservoir 14 and outlet 60 for controlling the flow of water from the reservoir 14 to the outlet or drain 60.

Figure 5:
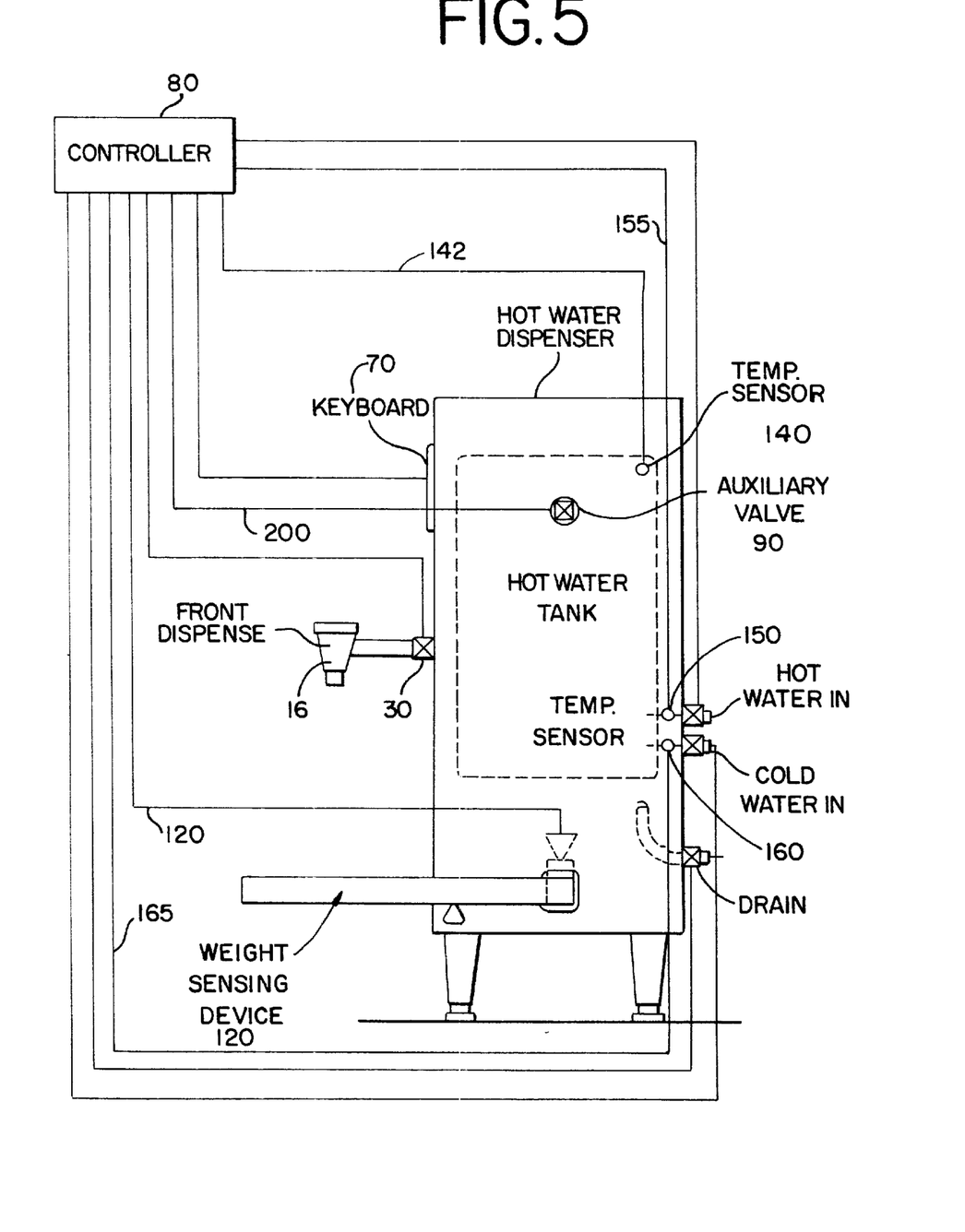
FIG. 5 is a schematic illustration of a control system in the present invention.

The heated water dispensing apparatus 10 also includes a selector or key board 70 for setting operational parameters of the heated water dispensing apparatus 10, e.g, the temperature of water produced. In the illustrated embodiment, the selector or key board 70 is provided on the front panel 18 of the housing 12. As illustrated in FIG. 5, a controller 80 is coupled to the keyboard 70 for receiving selected operational parameters entered with the keyboard 70. As also shown in FIG. 5, the controller 80 is coupled to each of the other components of the dispenser 10 for controlling their operation.

Advantageously, the heated water dispensing apparatus 10 of the present invention also includes at least one auxiliary valve or device outlet valve 90. In the illustrated embodiment, two auxiliary or device outlet valves 90 are provided, on opposite sides of the housing 12. Each auxiliary or device outlet valve 90 is connectable to a remote device 100, for controllably and automatically delivering heated water to a remote device 100.

Now that the general construction of the present invention has been described, the components of the heated water dispensing apparatus 10 will be examined in greater detail.

As stated above and best seen in FIG. 3, the front panel 18 includes the selector panel or key board 70 for setting operational parameters of the heated water dispensing apparatus 10. The selector or keyboard 70 includes various buttons for setting operational parameters such as the volume of water to be dispensed, the temperature of water to be dispensed, from which valve (e.g, the dispense or auxiliary valve) water is to be dispensed, etc. The selector panel or keyboard 70 also includes a power on/off switch and an indicator lamp for indicating to the operator the operational state of the dispenser. For example, the indicator lamp flashes red during a dispensing operation. Likewise, the indicator lamp provides a green light when dispensing has been completed and/or the dispensing apparatus 10 is ready for another sequence of operations. An override button may also be provided on the selector or keyboard 70 for stopping dispensing if necessary; e.g., an incorrect size receptacle 25 has been placed under the faucet 16 and the receptacle 25 is overflowing.

Advantageously, in the present invention, the selector or keyboard 70 is a digital device and includes a digital readout display 75. The digital construction of the selector or keyboard 70 enhances the programmability of the heated water dispensing apparatus 10. In particular, the digital construction of the selector or keyboard 70 increases the range of dispensing temperatures which can be set or selected. Using the heated water dispensing apparatus 10 of the present invention, a user can set the temperature of water to be produced or dispensed at any temperature between approximately 60° F. and 230° F. This represents a distinct improvement over prior art devices in which only a narrow band of temperatures (typically 10° F.) could be set, thereby limiting the utility of the prior art devices.

Attention will now be directed to the faucet or spigot 16. As stated above, the faucet or spigot 16 is provided on the front panel 18 of the housing 12 for dispensing water from the reservoir 14. In a preferred embodiment, the faucet or spigot 16 is electronically controlled so that water is dispensed automatically from the reservoir 14 through the faucet or spigot 16 and into a container 25. Specifically, it is preferred that the dispense valve 30 comprise a solenoid valve and that the dispense valve 30 operate under control of the controller 80 for electronically controlling the dispensing of hot water from the dispenser 10. Advantageously, in the present invention the controller 80 controls the dispense valve 30 so that when a user selects a temperature of water to be produced, no water may be dispensed through the faucet 16 until water of the selected temperature has been produced. That is, the controller 80 is adapted to close the dispense valve 30 while water of the selected temperature is being produced and thereby prevent dispensing before the selected temperature has been reached. It will be apparent to those skilled in the art that means may also be provided for manually activating the faucet 16 and dispense valve 30, in case electronic activation of the valve 30 should fail. In the preferred embodiment of the present invention, however, such manual activation means would normally be inoperative to prevent operator related dispensing errors.

Figure 2:
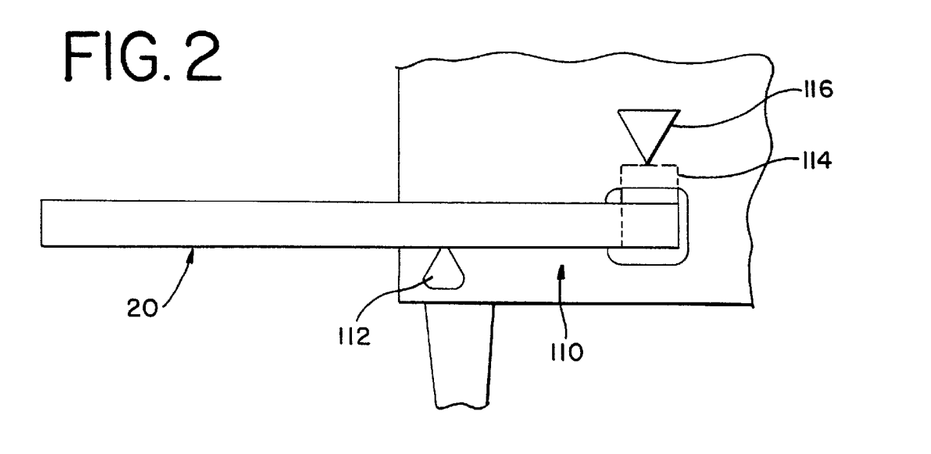
FIG. 2 is an enlarged, partial fragmentary, diagrammatic side elevational view of a portion of a container platform including a weighing assembly according to the invention.

The front panel 18 of the housing 12 is also provided with the container platform 20. The container platform 20, as shown in FIG. 1 and FIG. 2, is substantially rectangular and extends from an interior portion of the housing 12 The container platform 20 provides an elevated surface or ledge beneath the faucet 16 on which to rest a container or receptacle 25 for receiving water from the faucet or spigot 16. In this regard, the container platform 20, preferably, extends sufficiently far from the front panel 18 of the housing 10 so that containers 25 of a variety of sizes can rest securely on the platform 20. However, it is preferred that the platform 20 should not extend so far from the front panel 18 that it becomes obstructive or so that it makes the dispensing apparatus 10, itself, unstable when a container 25 is placed on the platform 20.

Advantageously, in the present invention the container platform 20 is coupled to a weighing assembly 110. The weighing assembly 110 allows the weight of water dispensed into a container 25 to be monitored by the controller 80. Specifically, the weighing assembly 110 is adapted to create a weight control signal related to the weight of water dispensed from the apparatus 10. The weight control signal is transmitted to the controller 80 via a control line 120 (FIG. 5).

As best seen in FIG. 2, the weighing assembly 110 includes a hardened fulcrum 112 on which the platform 20 pivots when a container 25 is placed on the platform 20 or when water is dispensed into a container 25 positioned on the platform 20. The weighing assembly 110 also includes a cross bar 114 and a load cell or strain gauge 116. The cross bar 114 transmits the force created when the platform 20 pivots on the fulcrum 112 to the load cell or strain gauge 116; i.e, the cross bar 114 transmits the force exerted on the platform 20 when a container 25 is placed on the platform 20 or when water is dispensed into a container 25 positioned on the platform 20. This transmitted force is manifested as a pressure applied to the load cell or strain gauge 116. The load cell or strain gauge 116 generates an output voltage in response to the pressure applied to it through the cross bar 114. The output voltage changes with variations in the pressure. Specifically, the output voltage changes in direct proportion to the pressure applied to the load cell or strain gauge 116. The pressure applied to the load cell or strain gauge 116 is in turn directly proportional to the weight on the platform 20. Accordingly, the output voltage generated by the load cell or strain gauge 116 is used to generate the weight control signal sent to the controller 80 of the dispensing apparatus 10.

The load cell or strain gauge 116 preferably comprises the "Bunn Load Cell" described in U.S. Pat. No. 5,386,944, issued Feb. 7, 1995, entitled "Weight Controlled Grinder And Method Of Grinding Coffee Beans," and assigned to the Assignee of the present invention, the disclosure of which is hereby incorporated by reference. However, it can comprise any other suitable strain gauge or pressure sensor, e.g., a piezoresistor sensor.

It should be noted that the cantilevered construction of the weighing assembly 110 provides an advantage. In particular, the cantilevered construction means that the load 116 cell may be positioned within the housing 12, instead of being placed directly beneath the container 25. Such positioning of the load cell 116 reduces the susceptibility of the load cell 116 to damage and helps simplify the construction of the heated water dispensing apparatus 10.

It should also be noted that, advantageously, the heated water dispensing apparatus 10 is adapted to "tare" the weight of a container 25. In particular, when a container 25 is placed on the platform 20, the weighing assembly 110 generates a weight control signal corresponding to the weight of the container 25 and transmits this weight control signal to the controller 80. The controller 80 stores this weight control signal so as to establish a zero reference point for weighing the liquid dispensed into the container 25. Thus, as water is dispensed into the container 25, only the weight of the water will be weighed and not the weight of the container 25.

As stated above, the weighing assembly 110 generates a weight control signal corresponding to the weight of a container 25 or to the weight of water dispensed into a container 25 and transmits the weight control signal to the controller 80. Advantageously, this operative coupling means that the weight of water on the platform 20 and, hence, the weight of water dispensed can be monitored and controlled by the controller 80. In particular, the controller 80 is adapted to control the dispense valve 30 in accordance with the weight control signals so that a selected volume of water is accurately and automatically dispensed from the dispense valve 30. Such automatic dispensing precludes wastage or insufficient dispensing of heated water..

In operation, a user selects a volume and temperature of water to be dispensed; i.e, enters the selections at the keyboard 70. A volume control signal and temperature control will be generated in response to the selected volume and be transmitted to the controller 80. The controller 80 is adapted to determine the weight of water of the selected temperature corresponding to the selected volume of water of the selected temperature and store this equivalent weight in its memory. It will be apparent to those skilled in the art that such a determination can be achieved by storing the density of water at various temperatures in the controller memory. The controller 80 then selectively operates the inlet valves 45, 55, outlet valve 65, and a heater 130 (not illustrated) retained in the reservoir to produce water of the selected temperature in the reservoir 14. When water of the selected temperature has been produced, the controller 80 will then operate the dispense valve 30 so that water is dispensed through the faucet 16 and into a container 25. As water is dispensed, the controller 80 receives weight control signals from the weighing assembly 110 corresponding to the weight of water dispensed. The controller 80 compares these weight control signals to the equivalent weight and operates the dispense valve 30 in accordance with the comparison. Specifically, the controller 80 operates the dispense valve 30 so that when the weight of water corresponding to the selected volume has been dispensed, the dispense valve 30 is shut and further dispensing is precluded. Thus, advantageously, with the dispensing apparatus 10 of the present invention neither too much or too little water is dispensed and the problems associated with using an inaccurate amount of water (e.g. wastage, poor product quality etc.) are avoided.

Attention will now be directed to the first and second water inlets 40, 50, first and second inlet valves 45, 55, and the drain valve 65. In this regard, reference is invited to FIG. 1.

As indicated in FIG. 1, the first and second water inlets 40, 50, first and second inlet valves 45, 55 and the drain valve 65 are preferably provided on a rear portion of the housing 12. It will be apparent to those skilled in the art, however, that the first and second water inlets 40, 50, inlet valves 45, 55 and drain valve 65 could be positioned elsewhere on the housing 12 without departing from the spirit and scope of the invention. The first water inlet 40 preferably couples the heated water dispensing apparatus to a heated water source and the second water inlet 50 preferably couples the apparatus 10 to an unheated water source. For convenience and availability, it is preferred that the heated water source comprise hot tap water and that the unheated water source comprise unheated tap water, The first and second inlet valves 45, 55 are preferably electronically operated valves so that the flow of water into the reservoir 14 from the water sources is automatic and is electronically controlled. In particular, it is preferred that the first and second inlet valves 45,55 comprise solenoid valves and that they operate under the control of the controller 80. Similarly, it is preferred that the drain valve 65 comprise a solenoid valve and operate under the control of the controller 80 so that the flow of water out of the reservoir 14 and into the drain 60 may be electronically controlled.

The provision of two water supply sources, i.e, hot and cold and the electronically controlled valves 45, 55, 65 in the present invention provides a unique advantage over prior art devices. In particular, it drastically reduces the time necessary to produce water of a selected temperature. The time necessary to provide water of a selected temperature is reduced in the present invention since the valves 45, 55, 65 are operated electronically and water flows into and out of the apparatus 10 automatically.

Advantageously, the time is also reduced in the present invention, because the controller 80 is adapted to operate the first inlet valve 45, the second water inlet valve 55 and the drain valve 65 in accordance with the selected temperature of water to be produced and the temperature of the water currently present in the reservoir 14. In this regard, it should be noted that selection of a temperature of water to be produced, by entering the temperature on the digital keyboard 70, generates a temperature selection control signal which is transmitted to the controller 80 via control line 142. Additionally, it should be noted that the dispensing apparatus 10 includes a temperature sensor 140 for sensing the temperature of water in the reservoir 14 and generating a reservoir temperature control signal. The reservoir temperature control signal is also transmitted to the controller 80. A first water inlet temperature sensor 150 and a second water inlet temperature sensor 160 are also provided for sensing, respectively, the temperature of the water from the heated water source and the temperature of the water from the unheated water source. The first and second water inlet temperature senors generate, respectively, first and second water inlet temperature control signals which are transmitted to the controller 80 via control lines 155, 165.

The controller 80 compares the received temperature selection with the reservoir temperature control signal and controllably operates the first inlet valve 45, the second inlet valve 55 and the drain valve 65 as a function of the comparison. For example, if the selected temperature is greater than the current temperature by a first predetermined amount, the controller 80 operates the drain valve 65 to empty the reservoir 14 of water and then operates the hot water inlet valve 45 to refill the reservoir 14 with hot water, so that the heat-up time of the water is shortened. Likewise, if the selected temperature is less than the current temperature by a second predetermined amount, the controller 80 operates the drain valve 65 to empty the reservoir 14 of water and then operates the cold water inlet valve 55 to refill the reservoir 14 with cold water, so that the cool-down time of the water is shortened. It should be noted that during these draining and refilling operations, the controller 80 shuts the dispense valve 30 to prevent dispensing from the dispensing apparatus 10. For temperature differences intermediate between the first and second predetermined amounts, the controller 80 may drain off predetermined amounts of water, add predetermined amounts of cold water, add predetermined amounts of hot water or perform a combination of these operations. The particular operation or combination of operations performed will depend on the particular difference between the selected temperature and the existing reservoir temperature.

As best illustrated in FIG. 3, the heated water dispensing apparatus 10 also includes the auxiliary or device outlet valves 90 which are connectable to remote devices 100 for automatically dispensing heated water to these remote devices 100. In the illustrated embodiment, two auxiliary or device outlet valves 90 are provided and are positioned on opposite sides of the housing 12. It will be apparent to those skilled in the art, however, that a fewer or greater number of auxiliary or device outlet valves 90 may be desirable and that their position on the heated water dispensing apparatus 10 could differ without departing on the spirit and scope of the invention.

Figure 4:
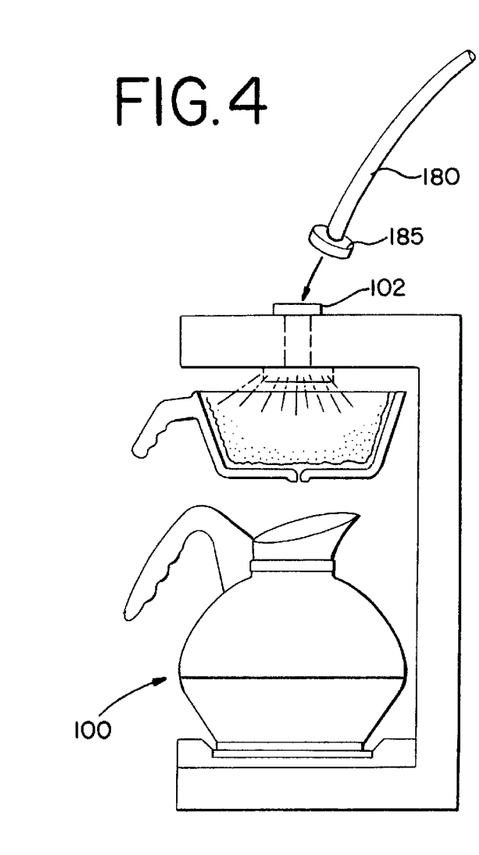
FIG. 4 is a diagrammatic, side elevational view of an auxiliary machine or satellite unit capable of use with the present invention.

Each of the auxiliary or device outlet valves 90 is connected to a coupling 170. The couplings 170 facilitate attachment of a hose 180 to the auxiliary or device outlet valve 90. The hoses 180 are used to connect the auxiliary or device outlet valves 90 to the remote devices 100. In this regard, the end of the hoses 180 which attach to the remote devices 100 may also include a coupling 185 for facilitating attachment of the hose to the remote device 100 and the remote device 100 itself may also include a complementary coupling 102, as indicated in FIG. 4.

Each of the auxiliary or device outlet valves 90 preferably comprises a motor controlled butterfly valve and operates under control of the controller 80. In this regard the, each auxiliary or device outlet valves 90 are coupled to the controller 80 via a control line 200. Because the auxiliary or device outlet valves 90 are motor controlled butterfly valves, they can be opened incrementally for precise control of the flow rate of hot water to a remote device 100.

The controller 80 controls the auxiliary or device outlet valves 90 in accordance with predetermined programs stored in its memory. In particular, for each remote device 100 there is stored, a temperature, a volume and a flow rate of water appropriate for that remote device 100. The controller 80 is adapted to retrieve the data for a remote device 100 in response to an operator selecting a remote device 100 into which water is to be dispensed. That is, when an operator selects a remote device 100 by pushing an appropriate button on the selector or keyboard 70, the controller 80 retrieves from its memory the volume, flow rate and temperature of water required for the remote device 100. The controller 80 then causes water of the selected temperature to be produced and when it has been produced opens the appropriate auxiliary or device outlet valve 90 sufficiently to achieve the required flow rate. The controller 80 monitors the length of time the auxiliary or device outlet valve 90 is opened to determine how much water has been dispensed to the remote device 100 and when the required volume has been dispensed shuts the auxiliary or device outlet valve 90.

For example, suppose the selected remote device 100 were an iced tea maker. Depression of an "iced tea" button on the heated water dispensing apparatus would cause the controller 80 to determine that 76 ounces of 206° F. water delivered at 25.33 ounces per minute should be provided to the iced tea maker. The controller 80 would then operate the heater 130 and valves 45, 55, 65 to produce 206° F. water. Once produced, it would open the auxiliary or device outlet valve 90 coupled to the iced tea maker to achieve a 25.33 oz/min flow rate. It would keep the auxiliary or device outlet valve 90 open three minutes so that 76 oz would be delivered to the iced tea maker.

Although the above example involved an iced tea maker, it will be apparent to those skilled in the art that many different types of remote devices 100 are connectable to the heated water dispensing apparatus 10 of the present invention. For example, the heated water dispensing apparatus 10 of the present invention is equally usable with coffee makers, soup makers, hot chocolate makers, etc.

Advantageously, provision of the auxiliary or device outlet valves 90 obviates manual delivery of heated water to remote devices 100. This increases the efficiency of the devices and avoids the many hazards of manual delivery. Automatic dispensing also avoids operator related errors, such as the provision of the incorrect volume or incorrect temperature of water to the remote device 100 which would degrade the quality of the product made by the remote device 100.

It should be noted that the heated water dispensing apparatus 10 of the present invention is adapted to dispense water through the auxiliary or device outlet valve 90 simultaneously with the dispensing of water through the dispense valve 30. Such simultaneous dispensing enhances the efficiency and utility of the heated water dispensing apparatus 10 of the present invention.

Figure 6:
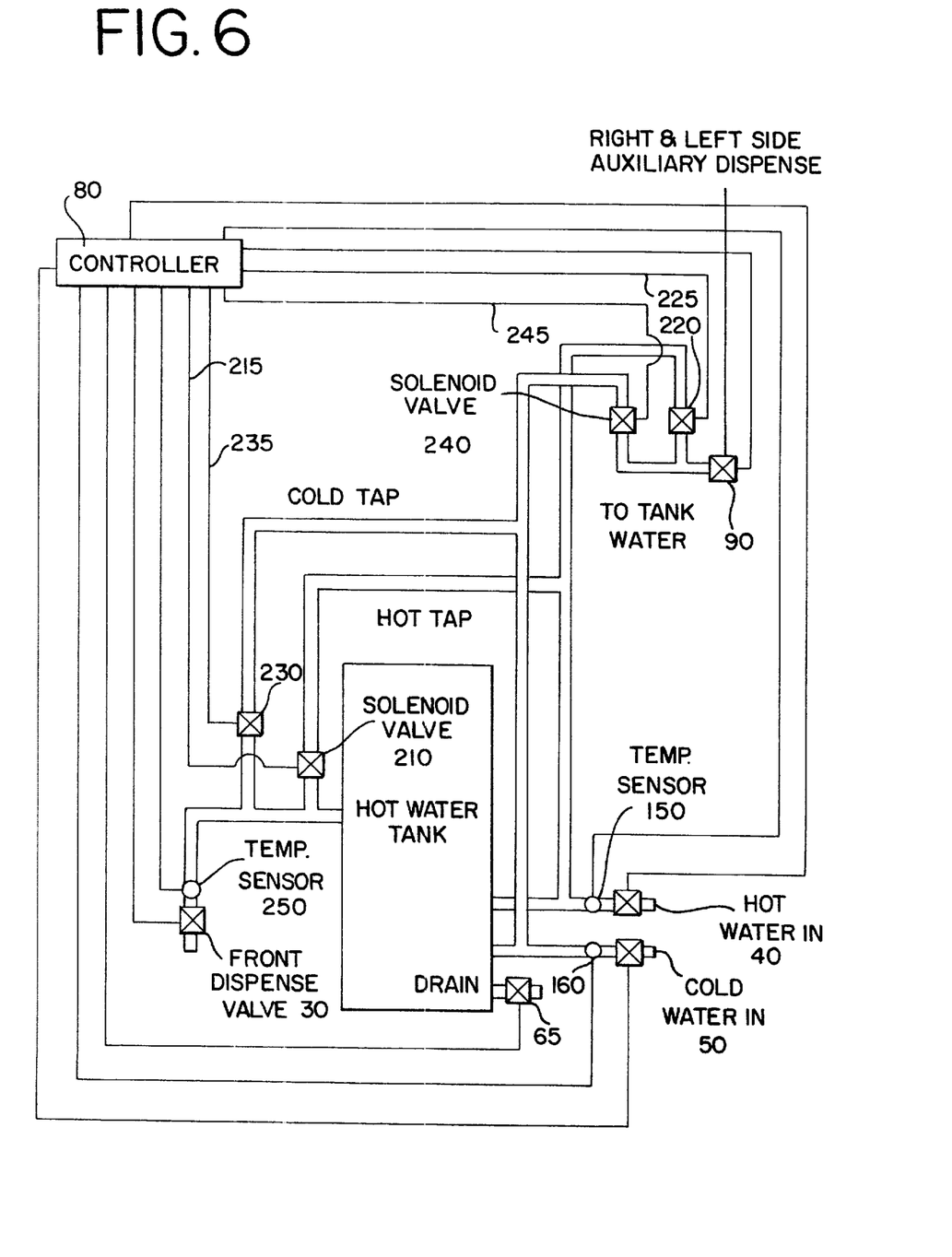
FIG. 6 is a schematic illustration of the control system in an alternative embodiment of the present invention.

Reference is now invited to FIG. 6 which shows a schematic diagram of an alternative embodiment of the present invention. The construction of the alternative embodiment shown in FIG. 6 is essentially the same as the embodiment shown in FIG. 5. However, unlike the embodiment illustrated in FIG. 5, in the alternative embodiment of FIG. 6, the dispense valve 30 and each of the auxiliary or device outlet valves 90 are also coupled to the heated water source and the unheated water source. Heated water valves 210, 220 are provided for controlling the flow of heated water from the heated water source to the dispense valve 30 and each of the auxiliary or device outlet valves 90. Likewise unheated water valves 240, 230 are coupled to each of the auxiliary or device outlet valves 90 and the dispense valve 30 respectively for controlling the flow of unheated water from the unheated water source to the dispense valve 30 and each of the auxiliary or device outlet valves 90. An additional temperature sensor 250 is also provided adjacent the dispense valve 30 for sensing the temperature of water entering the dispense valve 30.

The heated water valves, 210, 220 and unheated water valves 230, 240 operate under the control of the controller 80. In this regard, the heated water valve 210 is coupled to the controller 80 via control line 215, and the heated water valve 220 is coupled to the controller 80 via control line 225. Similarly, the unheated water valve 230 is coupled to the controller 80 via control line 235 and the unheated water valve 240 is coupled to the controller 80 via control line 245. Preferably, the heated water valves, 210, 220 and unheated water valves 230, 240 comprise butterfly solenoid valves so that the flow rate through these valves can be precisely controlled.

Advantageously, the provision of these additional valves 210, 220, 230, 240 i.e, the direct coupling of the dispense valve 30 and auxiliary or device outlet valves 90 to the heated water source and unheated water source, means that heated water of different temperatures can be dispensed simultaneously from the heated water dispensing apparatus 10a. Specifically, this arrangement allows water of a first temperature to be dispensed through the dispense valve 30 simultaneously with water of a second temperature being dispensed through one or more auxiliary or device outlet valves 90. The different water temperatures are achieved by mixing different predetermined amounts of water from the heated water source and unheated water source with the water from the reservoir 14 at the dispense valve 30 and at the auxiliary or device outlet valves 90 to produce water of different temperatures. For example, suppose the water in the reservoir were 212° F. and it was desired to provide water at 200° F. through the dispense valve 30 and water at 206° F. through an auxiliary or device outlet valve 90. In this situation, the controller 80 would operate the valve 230 so that a first amount of unheated water from the unheated water source were mixed with water from the reservoir 14 to produce water at 200° F. at the dispense valve 30. Likewise, it would operate the valve 240 so that a second amount of unheated water from the unheated water source were mixed with water from the reservoir 14 at the auxiliary or device outlet valve 90 to produce water of 206° F. before being dispensed through the reservoir 14. Thus, by controlling the proportion of water from the heated water source and unheated water source to water from the reservoir 14, the temperature of the reservoir water, and the flow rates from the heated and unheated water sources and the reservoir, water over a wide range of temperatures can be dispensed simultaneously from the reservoir 14.

Thus, an improved heated water dispensing apparatus 10 has been described. The heated water dispensing apparatus 10 of the present invention includes a selector 70, which allows a wide range of water dispensing temperatures to be selected. The heated water dispensing apparatus 10 is capable of automatically producing heated water of a selected temperature, preventing dispensing of water before the selected temperature has been reached, and automatically dispensing heated water when the temperature has been reached. Additionally, the heated water dispensing apparatus 10 of the present invention includes a weighing assembly 110 and electronically operated valves 45, 55, 65. The weighing assembly 110 allows the heated water dispensing apparatus of the present invention to monitor the volume of water dispensed. The electronic nature of the valves 45, 55, 65 means that the valves 45, 55, 65 can be opened and closed automatically. Thus, advantageously, the heated water dispensing apparatus 10 of the present invention can automatically operate a valve to dispense a selected volume of water and shut the valve when the volume has been dispensed to prevent further dispensing. Moreover, the heated water dispensing apparatus 10 of the present invention includes the electronically operated auxiliary or device outlet valves 90 for automatically dispensing water to remote devices 100. Accordingly, spilling and other problems with manual delivery in the prior art are avoided. Furthermore, the heated water dispensing apparatus 10 of the present invention is connected to both a heated water source and an unheated water source and is adapted to add predetermined quantities of water from the water sources to the reservoir 14 in accordance with the temperature of water to be produced. Such a arrangement helps to reduce the time necessary to produce water of a selected temperature. Additionally, by coupling of the heated water source and unheated water source to the dispense valve 30 and auxiliary or device outlet valves 90, water of different temperatures can be dispensed simultaneously from the heated water dispensing apparatus 10.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

We claim:

1. A heated water dispensing apparatus for dispensing water at a selected temperature comprising:

a reservoir for retaining water;

a controller;

a heater coupled to said reservoir and said controller for controllably heating the water in the reservoir;

a heated water inlet valve coupled to said controller and said reservoir for controlling the flow of heated water from a heated water source;

an unheated water inlet valve coupled to said controller and said reservoir for controlling the flow of unheated water from an unheated water source;

a dispense valve coupled to said controller and communicating with said reservoir for controllably dispensing water from said reservoir;

a temperature sensor coupled to said controller and said reservoir for sensing the temperature or water in the reservoir and generating a temperature control signal relating to the temperature sensed; and a temperature selector coupled to said controller for selecting a temperature of water to be produced and generating a selection control signal corresponding to the selected temperature;

said controller receiving said temperature control signal and said selection control signal and controllably operating said heater, said heated water inlet valve and said unheated water inlet valve in accordance with the received signals to produce water of the selected temperature in the reservoir, said controller closing said dispense valve while water of the selected temperature is being produced to prevent dispensing of water from said reservoir before water of the selected temperature has been produced.

2. A heated water dispensing apparatus according to claim 1 further comprising a heated water temperature sensor for sensing the temperature of the heated water from the heated water source and for generating a heated water temperature control signal corresponding to the temperature of the heated water sensed, an unheated water temperature sensor for sensing the temperature of the unheated water from the unheated water source and generating an unheated water temperature control signal corresponding to the unheated water temperature sensed, said controller receiving said temperature control signal, said unheated water temperature control signal and said heated water temperature control signal and controllably operating said heater and said inlet valves in accordance with said received temperature control signals to produce water of the selected temperature in the reservoir.

3. A heated water dispensing apparatus according to claim 1 in which said dispense valve comprises a solenoid valve.

4. A heated water dispensing apparatus according to claim 1 in which said heated water inlet valve and said unheated water inlet valve comprise solenoid valves.

5. A heated water dispensing apparatus according to claim 1 in which said temperature selector is adapted for selecting a temperature from a range of temperatures in which the water is in a liquid state.

6. A heated water dispensing apparatus for dispensing water at a selected temperature comprising:

a reservoir for retaining water;

a controller;

a heater coupled to said reservoir and said controller for controllably heating the water in the reservoir;

an inlet valve coupled to said reservoir, to said controller, and to at least one of a heated water source and an unheated water source for controlling the flow of water from a water source;

a dispense valve coupled to said controller and communicating with said reservoir for controllably dispensing water from said reservoir;

a temperature sensor coupled to said controller and said reservoir for sensing the temperature of water in the reservoir and generating a temperature control signal relating to the temperature sensed;

a temperature selector coupled to said controller for selecting a temperature of water to be produced and generating a selection control signal corresponding to the selected temperature;

a drain communicating with said reservoir for draining off water retained in said reservoir; and a drain valve coupled to said drain, said controller, and said reservoir for controlling the flow of water from said reservoir into the drain;

said controller receiving said temperature control signal and said selection control signal and controllably operating said heater, said inlet valve, and said drain valve in accordance with said received signals to produce water of the selected temperature in the reservoir, said controller closing said dispense valve while water of the selected temperature is being produced to prevent dispensing of water from said reservoir before water of the selected temperature has been produced.

7. A heated water dispensing apparatus according to claim 6 in which said drain valve comprises a solenoid valve.

8. A heated water dispensing apparatus according to claim 6 in which said dispense valve comprises a solenoid valve.

9. A heated water dispensing apparatus according to claim 6 in which said temperature selector is adapted for selecting a temperature from a range of temperatures in which the water is in a liquid state.

10. A heated water dispensing apparatus comprising a reservoir for retaining a quantity of water;

a controller;

a heater coupled to said reservoir and said controller for controllably heating the water retained in the reservoir;

a dispensing valve coupled to said controller and communicating with said reservoir for controllably dispensing water from the reservoir;

a volume selector for selecting a volume of water to be dispensed and for producing a volume control signal corresponding to the selected volume;

a weighing assembly for receiving a dispenser into which said selected volume of water is dispensed and for sensing the weight of water dispensed into said dispenser, said weighing assembly being adapted to generate a weight signal corresponding to the weight of water dispensed;

said controller receiving said volume control signal and said weight signal, said controller determining from said volume control signal the weight of water corresponding to said selected volume of water, said controller being adapted to compare said weight signal to said determined corresponding weight and to control said dispensing valve as a function of said comparison so that said dispensing valve is shut off when said weight control signal and said corresponding weight reach parity.

11. A heated water dispensing apparatus comprising according to claim 10 further comprising:

a temperature sensor coupled to said reservoir and said controller for sensing the temperature of water in the reservoir and generating a temperature control signal corresponding to the temperature sensed;

a temperature selector for selecting a temperature of water to be produced and generating a temperature selection signal corresponding to the selected temperature;

said controller receiving said temperature selection signal, said volume control signal and said weight control signal, and determining from said temperature selection signal and said volume control signal the weight of water of the selected temperature equivalent to the selected volume of water of the selected temperature, said controller being adapted to control said heater to produce water of the selected temperature, said controller also being adapted to compare said weight control signal to said determined equivalent weight and to control said dispensing valve as a function of said comparison so that said dispensing valve is shut off when said weight control signal and said determined weight reach parity.

12. A heated water dispensing apparatus comprising according to claim 11 in which said controller controls said dispensing valve to prevent dispensing of water from said dispensing valve until water of the selected temperature has been produced in the reservoir.

13. A heated water dispensing apparatus comprising according to claim 10 in which said dispensing valve comprises a solenoid valve.

14. A heated water dispensing apparatus comprising according to claim 10 in which said weighing assembly is adapted to weigh said dispenser prior to dispensing of water into said dispenser to determine a dispenser weight, said weighing assembly being adapted to use said dispenser weight to establish a zero reference point so that the weight sensed by the weighing assembly during dispensing of water into said dispenser is the weight of water dispensed into said dispenser.

15. A heated water dispensing apparatus for controllably dispensing heated water to at least one remote device, said apparatus comprising:

a reservoir for retaining a quantity of water;

a controller;

a heater coupled to said reservoir and said controller for heating the water retained in the reservoir;

an inlet valve coupled to said controller and communicating with said reservoir for controlling the flow of water from a water source;

a temperature sensor coupled to said reservoir and said controller for sensing the temperature of water in the reservoir and generating a temperature control signal corresponding to the temperature sensed;

at least one device outlet valve coupled to said controller and communicating with said reservoir, each device outlet valve controllably dispensing water to one of said remote devices;

a device selector for selecting a remote device into which heated water is to be dispensed and for generating a device selector signal corresponding to the remote device selected;

said controller receiving said device selector signal and determining in response to the device selector signal the quantity, flow rate and temperature of water required to produce a predetermined substance in the selected remote device, said controller receiving said temperature control signal and controllably operating said heater and said inlet valve in accordance with the temperature control signal so that water of the required temperature is produced in the reservoir, said controller operating the device outlet valve corresponding to the selected remote device when the water in the reservoir reaches the required temperature so that the required quantity of water at the required flow rate is dispensed to the selected device.

16. A heated water dispensing apparatus according to claim 15 in which said inlet valve and each said device outlet valve comprise solenoid valves.

17. A heated water dispensing apparatus according to claim 15 in which each said device outlet valve comprises a butterfly valve for incrementally controlling the flow rate of water to one of said remote devices.

18. A heated water dispensing apparatus according to claim 15 further comprising at least one device coupling for removably coupling a remote device to a device outlet valve.

19. A heated water dispensing apparatus according to claim 15 further comprising an inlet valve coupling for removably attaching a remote device to said inlet valve so that water from said water source can be delivered directly to said remote device.

20. A method of dispensing a selected volume of water from a water dispensing apparatus into a receptacle, said method comprising the steps of:

determining the weight of water equivalent to said selected volume of water;

operating a dispensing valve of said water dispensing apparatus to dispense water into said receptacle;

weighing said receptacle as said water is dispensed to determine the weight of water dispensed into said receptacle;

comparing said weight of water dispensed to said determined equivalent weight; and     controlling said dispensing valve as a function of said comparison so that said dispensing valve is shut off when said dispensed weight of water and said determined equivalent weight reach parity.

21. A heated water dispensing apparatus for dispensing water at a selected temperature comprising:

a reservoir for retaining a quantity of water;

a controller;

a heater coupled to said reservoir and said controller for controllably heating the water retained in the reservoir;

a temperature sensor coupled to said controller and said reservoir for sensing the temperature of water in the reservoir and generating a temperature control signal relating to the temperature sensed;

an inlet valve coupled to said reservoir, to said controller, and to at least one of a heated water source and an unheated water source for controlling the flow of water to the reservoir from a water source;

a dispense valve coupled to said controller and communicating with said reservoir for controllably dispensing water from said reservoir into a dispenser;

at least one device outlet valve coupled to said controller and communicating with said reservoir for controllably dispensing water to at least one remote device;

a selector coupled to said controller for selecting at least a volume and a temperature of water to be dispensed through said dispense valve into a dispenser and a remote device into which water is to be dispensed through one of said device outlet valves, said selector generating a volume control signal in response to a volume being selected, a temperature selection signal in response to a temperature being selected, and a device selection signal in response to a remote device being selected;

a weighing assembly for receiving a dispenser into which a selected volume of water is to be dispensed and for sensing the weight of water dispensed into said dispenser, said weighing assembly being adapted to generate a weight signal corresponding to the weight of water dispensed;

said controller receiving said temperature control signal, said temperature selection signal, said volume selection signal, said device selection signal, and said weight signal, said controller controllably operating said heater, said inlet valve, said dispense valve and said device outlet valves in accordance with said received signals so that the selected volume of water of the selected temperature is dispensed through said dispensing valve, and so that a predetermined quantity of water of a predetermined temperature is dispensed at a predetermined flow rate through said device outlet valve to said selected remote device.

\* \* \* \* \*